United States Patent
Sprokel

3,932,026
Jan. 13, 1976

[54] LIQUID CRYSTAL DISPLAY ASSEMBLY HAVING DIELECTRIC COATED ELECTRODES

[75] Inventor: Gerard J. Sprokel, Fishkill, N.Y.

[73] Assignee: International Business Machines Corporation, Armonk, N.Y.

[22] Filed: May 27, 1975

[21] Appl. No.: 580,635

Related U.S. Application Data

[63] Continuation of Ser. No. 303,555, Nov. 3, 1972, abandoned.

[52] U.S. Cl. .................................. 350/160 LC
[51] Int. Cl.² ............................... G02F 1/13
[58] Field of Search .......................... 350/160 LC

[56] References Cited
UNITED STATES PATENTS

| | | |
|---|---|---|
| 3,647,280 | 3/1972 | Klein et al. ............ 350/160 LC |
| 3,730,607 | 5/1973 | Grabmaier et al. ....... 350/160 LC |

*Primary Examiner*—Edward S. Bauer
*Attorney, Agent, or Firm*—Henry Powers

[57] ABSTRACT

A display assembly in which a nematic liquid crystal is sandwiched between two supporting substrates. Each substrate has a layer of a conductive coating on the inside surface, at least one of which is overcoated with a dielectric film or layer to separate the conductive layer from the liquid crystal material. Embodiments include varied thicknesses of the dielectric in association with image and lead portions of the conductive coating.

18 Claims, 6 Drawing Figures

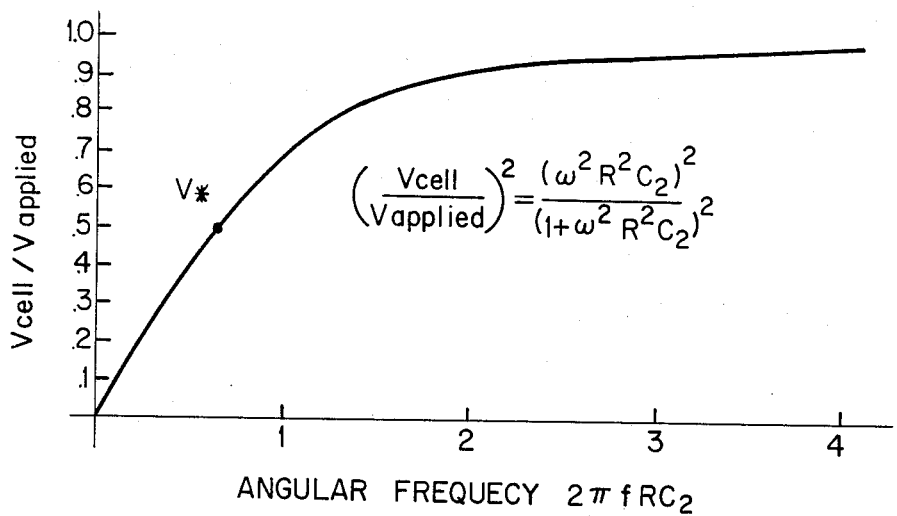
FIG. 4
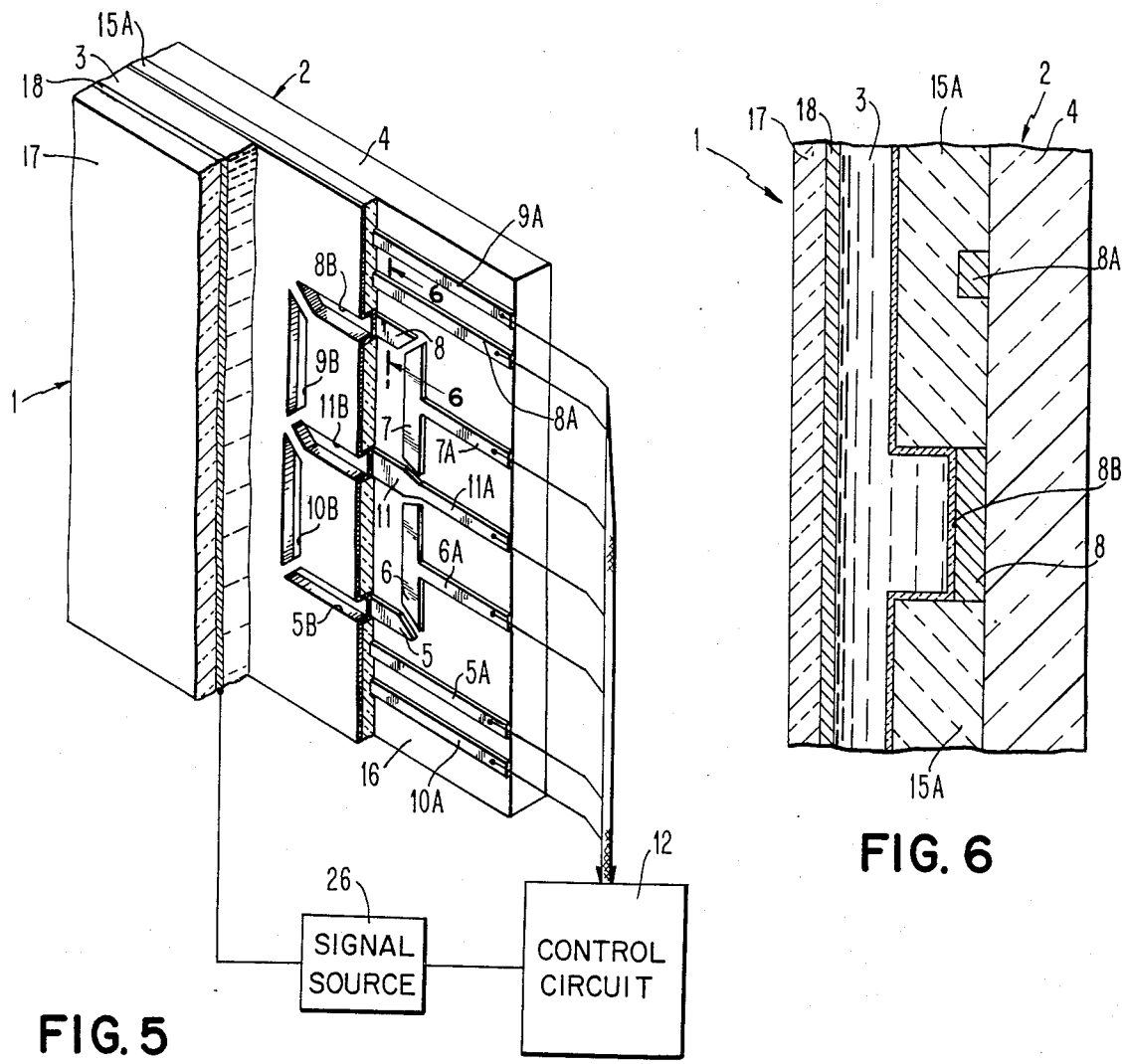
FIG. 5
FIG. 6

LIQUID CRYSTAL DISPLAY ASSEMBLY HAVING DIELECTRIC COATED ELECTRODES

This is a continuation, of application Ser. no. 303,555 filed Nov. 3, 1972 and now abandoned

BACKGROUND OF THE INVENTION

This invention relates to liquid crystal devices, and more particularly to nematic liquid crystal display assemblies.

The use of nematic liquid crystal materials and compositions for electro optical modulation of light, as in display assemblies for generating alpha-numeric characters, is well known. Typical devices of this nature and suitable nematic liquid crystal materials, therefore, can be found described in U.S. Pat. Nos. 3,625,591, 3,655,269 and 3,655,270. Illustrative of such nematic liquid crystals is p-methoxybenzylidene-p-n-butylaniline (also, commonly referred to as MBBA).

Heretofore, it is accepted in the art (as for example see U.S. Pat. No. 3,503,672) that ionic conduction is necessary to bring nematic liquid crystals into the scattering regime, with associated inclusion of appropriate additives to decrease the specific resistance of the liquid crystal cell to about $10^8$–$10^9$ ohm-cm. However, it has been found that at these levels of conductivity, reactions occur between the electrodes and such nematic liquid crystals which limit the useful life of display cells to a few hours in D.C. operation, or to a few weeks in square wave operation, with the electrodes often showing severe electrolytic corrosion.

Normally, it could be assumed that such corrosion could be constrained by protection of the metal electrodes with an insulating film in view of teachings of the nature disclosed in U.S. Pat. Nos. 3,257,903 and 3,600,060. In the first patent, a device is described utilizing dipole particles in which the side of an electrode disposed adjacent the particles is said to be covered by a transparent protective coating such as silicon monoxide. In the latter patent it is indicated that in a preferred mode, it is advantageous to use transparent insulating layers of suitable materials, such as glass and plastic, as a protective layer on top of transparent electrodes in cholesteric liquid crystal display devices. However, as will be observed, such units employ materials which are merely field sensitive without need of ionic conduction to bring them into a scattering mode.

Such an approach has not been seriously considered in the art for nematic liquid crystal devices since all of the applied field will appear across the thin insulator and thus not bring the nematic liquid crystal in the scattering mode. Also, as is well known, liquid crystal display assemblies generally employ electrodes comprised of an image portion and a lead portion for connection to a suitable signal means for generation of an electric field across the cell, or for an example see the above referenced U.S. Pat. No. 3,655,270. In operation of such a configuration, under an applied field, the image and lead portions or segments of the electrode, both activate the nematic liquid crystal material in the scattering mode with corresponding visual representation of each seen in display. To minimize the effect of the lead line, under an applied signal, its width is normally reduced to minimum dimensions acceptable for conduction of an electrical signal to the image segment of the electrode. Thus, as will be appreciated, there is a limit to which the width of the lead portion of the electrodes can be reduced for proper signal conduction.

SUMMARY OF THE INVENTION

Generally, speaking, there is provided, in accordance with this invention an electro-optic cell comprising a nematic liquid crystal composition sandwiched between two electrodes, at least one of which is isolated from the crystal material by a layer of dielectric material to provide novel structures for varied operations.

In one structure, at least one electrode is overcoated with a coating of a dielectric material having a predetermined D.C. breakdown voltage above which the cell is operated. In an alternate structure, one segment or portion of one electrode (eg. an image segment) is coated with a thin coating of the dielectric and the remaining portion of the electrode (eg. a conductor segment or another imaging segment) coated with a thicker layer of the dielectric. In this structure, the cell is operated at a d.c. voltage level above the breakdown voltage of the thin dielectric coating but below the breakdown voltage of the thick coating. In this manner, activation of the nematic liquid crystal is supressed opposite the non-image portions of the electrode. Also, where desired, two breakdown voltage levels can be employed for sequential operation of the cell. For example, a voltage level can be initially employed between the breakdown voltages of the thin and thick electric layers to activate the liquid crystal opposite the thin layer, followed by application of a second voltage level above the breakdown voltage of the thick dielectric coating to thereof activate the liquid crystal opposite both thicknesses of the dielectric coating.

These structures are also adopted for A.C. operation below the breakdown voltages of the dielectric layers. In this modification, the A.C. operation correlates the capacitances of the dielectric coating with the resistance of the liquid crystal layer to establish threshold frequencies for operation of the cell up to the cut-off frequency of the crystal material.

Where a uniform coating of the dielectric is employed, a predetermined thickness is preselected to establish a threshold frequency below the cut-off frequency of the liquid crystal material with operation of the cell at frequencies between the threshold and cut-off points.

Where varied thickness of the dielectric are employed over an electrode in which a thin film of dielectric is coated over imaging portions or segments of the electrode and thicker dielectric coatings are formed over non-imaging or a second imaging electrode segments, each thickness is selected to establish low and high threshold frequencies.

The cell can be operated at frequencies extending from the low threshold point (represented by the thin dielectric coating) to below the high threshold point (as represented by the thicker dielectric coating). Also, where the higher threshold frequency is below the cut-off frequency of the liquid crystal, the cell can be operated with sequentially increased frequencies above the threshold frequencies established by the thin and thick dielectric coatings to sequentially activate corresponding and adjacent portions of the liquid crystal.

As will be understood, where the thicker of the dielectric is selected which establishes a threshold above the cut-off frequency of the nematic liquid crystal, operation of the cell will be at frequencies extending from the threshold frequencies (established by the thin dielectric coating) to the cut-off frequency of the liquid crystal.

In all events, the dielectric coating will comprise thinner portions establishing a threshold frequency sufficiently below the cut-off frequency of the liquid crystal to provide a reasonable frequency range for operation of the cell.

It is to be understood that this invention also applies to the use of three or more different thicknesses of dielectric coatings over corresponding portions of an electrode with desired sequential application of breakdown voltage or threshold frequencies to sequentially activate corresponding portions of a liquid crystal material opposite the selected portions of the dielectric coating. Thus, the dielectric coating can be applied in a multiplicity of thicknesses, over an electrode, for application of breakdown voltage or threshold frequencies in any prescribed sequence or pattern for activating corresponding portions of the liquid crystal material opposite these sequenced areas of the dielectric coated electrodes.

The foregoing and other objects, features and advantages of the invention will be apparent from the following more particular description of preferred embodiments of the invention as illustrated in the accompanying drawings.

BRIEF DESCRIPTION OF THE DRAWINGS

FIG. 4 shows a curve of AC operation of a nematic liquid crystal cell in accordance with this invention illustrating the effects of the frequency variations on the potential across the crystal with a fixed applied voltage across the cell.

FIG. 5 is a perspective view illustrating another embodiment of this invention.

FIG. 6 is a cross-sectional view taken along line 6—6 of FIG. 5.

DESCRIPTION OF PREFERRED EMBODIMENTS

Figures 1, 2, 3:
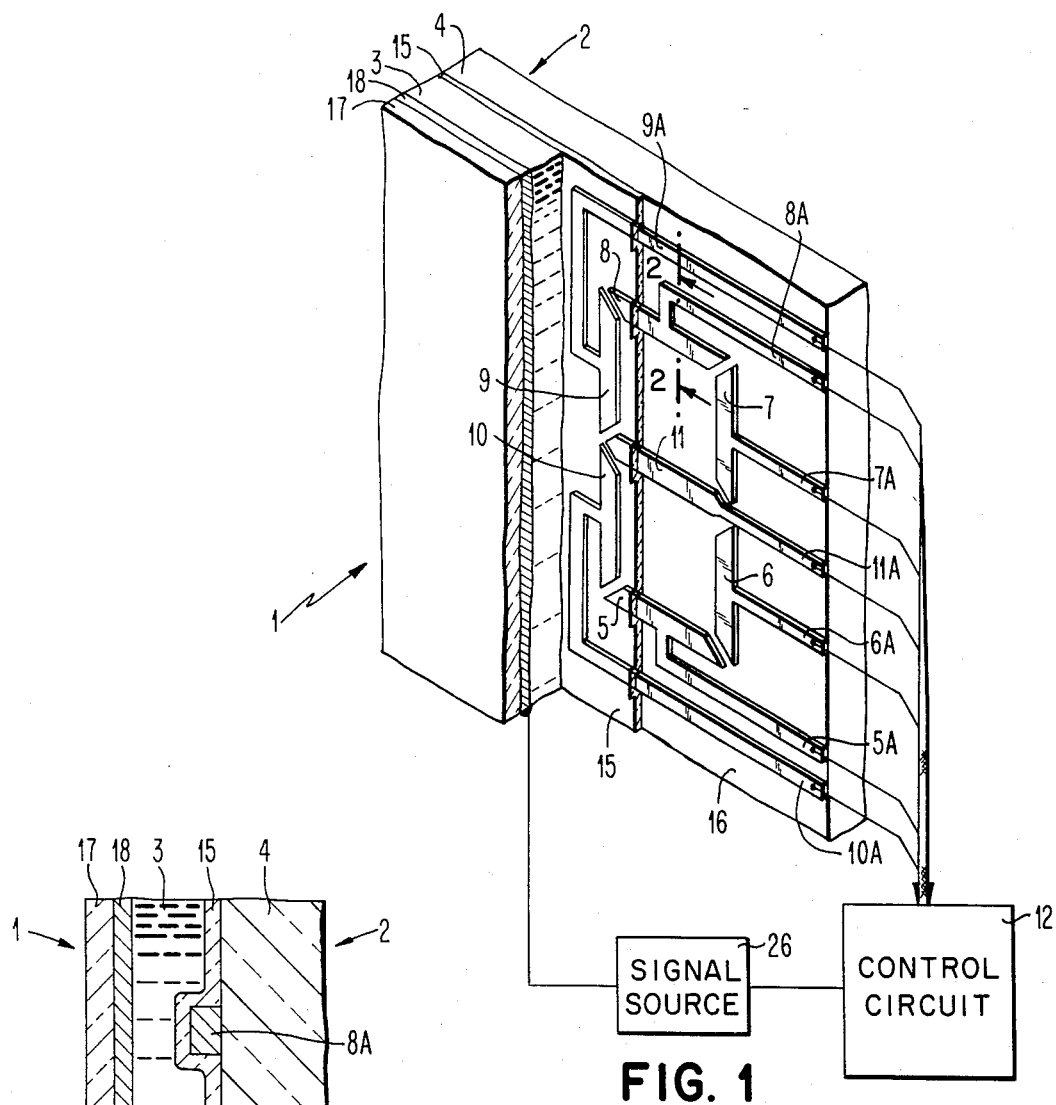
FIG. 1 is a perspective view, partly in section, illustrating one embodiment of this invention utilizing a dielectric or insulating coating over an electrode of a nematic liquid crystal cell.
FIG. 2 is a cross sectional view taken along line 2—2 of FIG. 1.
FIG. 3 illustrates an equivalent circuit of a nematic liquid crystal cell in accordance with the invention.

In FIG. 1, a liquid crystal cell is shown adapted as a display assembly for optical representation of desired configurations, here specifically illustrated as a numerical display.

The unit assembly is fabricated from two planar support units 1 and 2 disposed in parallel relationship to each other to define an enclosed area in which is disposed a film or layer 3 of nematic liquid crystal material, which illustratively may be comprised of p-methoxybenzylidene-p-n-butylaniline, also commonly known as MBBA. In accordance with usual practice, only one of the planar supports need be transparent, while the other of the supports may be transparent, reflective or absorptive depending on the desired mode of operation. Alternative, a reflective unit may be formed from two transparent support units of which an external face of one may be coated with a reflective film such as chromium. Although the invention is applicable for all these variations for purposes of convenience it will be illustratively described with reference to the use of transparent supports.

Accordingly, support unit 2 will conventionally include a transparent substrate 4 having deposited on it a conductive film pattern which illustratively may be for numerical representation, with it being understood that other patterns can be employed.

The particular electrode pattern shown on substrates 4 is for a seven-segment numeric display. The electrode pattern can be deposited as a plurality of spaced film segments of a conductive material to define a like plurality of electrode image segments 5 to 11 each of which has a corresponding one of associated conductor or lead segments 5A to 11A which extend to an edge of the substrate where connection can be made to addressing circuits, as generally indicated as a control circuit 12 in the drawings. For reflective modes of operation the electrode pattern can comprise reflective films of conductive composition such as chromium. Typically, these electrode films can be deposited in thickness of about 1000 Angstroms.

In turn, the entire electrode pattern is coated with a film 15 of a dielectric material which conveniently may be deposited over the entire inner face 16 of substrate 4. Typical dielectric compositions suitable for application are $Al_2O_3$, $SiO_2$, $Si_3N_4$ and the like, which may be coated in any suitable manner, as by R. F. sputtering. Where the cell is to be operated in a transparent mode, the dielectric coating will be transparent, and, conversely, for reflective operating modes, the dielectric can be opaque. Illustrative dielectric coatings have been prepared from R. F. sputtered films of $Al_2O_3$ in thickness of 500, 1000 and 2000 Angstroms, and of $SiO_2$ up to 2.5 microns. However, the specific thickness of the dielectric film is not critical, since they are mere matters of design readily determinable for providing operating voltages and/or frequencies from practical and reasonable signal sources, illustrated as sources 26 in the drawings.

For example, in D.C. mode, the cell can be operated at any suitable voltage level above the breakdown voltage of the dielectric film. Coversely, where the signal source is fixed, the deposition of the dielectric can be controlled so as to result in a thickness providing a breakdown voltage below the level of the signal source. In experimental cells a 40 volt supply was employed to operate above the breakdown voltage of 500 and 1000 Angstrom thick films of $Al_2O_3$.

In A.C. operation, any desired threshold frequency, within practical ranges, can readily be obtained by controlling the capacitance of the deposited dielectric film and the electrical resistance of the liquid crystal material. The capacitance of the film is determined by the film thickness and by its permittivity which is a material constant. The electrical resistance of the liquid crystal material is controlled by the addition of suitable dopants such as quaternary ammonium salts.

The other support plate 1 also includes a base substrate 17 having deposited thereon a conductive coating 18. As will be understood, the opacity or transparency of substrate 17 and electrode 18 will be determined by the desired mode of operating the cell as correlated to the light transmitting status of the support unit 2. Thus, for a transparent mode of operation, the elements, eg. substrate 17 (glass) and electrode 18 of support unit will be transparent. In a reflecting mode of operation, substrate 17 and electrode 18 will be transparent, if support unit 2 is adapted for reflection. Conversely, if support unit 1 is adapted for reflection, the components of the other support unit 2 will be transparent, eg. substrate 4 (glass), the electrode pattern ($In_2O_3$) and the dielectric film 15 ($Al_2O_3$) Alternately, all components of both support units 1 and 2 can comprise transparent films if a reflective film is coated on a back face of one of the support units 1 and 2.

On assembly of the units of the cell, the liquid crystal layer 3 can be confined between support plate units 1 and 2 by a conventional seal around their peripheries, as for example, a gasket, glass frit or epoxy resins.

It is noted that in the particular embodiment described above, only one of electrodes about the liquid crystal material was insulated therefrom by a dielectric coating, eg. the electrode pattern comprised of image segments 5 to 11 and conductor segments 5A to 11A. As will be understood, the dielectric film can be alternatively coated on the electrode 18, of support unit 1 with the electrode pattern and support unit employed without an insulating film of the dielectric. Also for a reflective mode of operation, all components of both support plate units 1 and 2, inclusive of substrates, electrodes and dielectric, can be transparent where a reflective coating is applied to the outer face of one of substrates 4 and 17.

Where only one electrode is insulated from the liquid crystal material, it was found preferable to connect the bare, uninsulated, electrode to the positive potential side of the signal to insure maximum constrainment of ionic injection at operating or stand by levels below the threshold voltage of the dielectric.

In experiments, the threshold voltage for distilled MBBA (obtained from the Eastman-Kodak Co.) utilizing such cells with bare electrodes (eg. chromium in one and $In_2O_3$ in, the other) was found to be 9 volts D.C. In contrast, the threshold voltage for the same material was found to be 15 volts D.C. when employed in a cell in which one electrode of a 1000 Angstrom thick chromium film was overcoated with a 1000 Angstrom thick film of aluminum oxide ($Al_2O_3$).

It is to be noted that this invention also comprehends the coating of both electrodes, of a cell, with a dielectric material wherein the suppression of chemical interaction between the electrodes and liquid crystal material is further enhanced. Also, in such a modification, proper polarity for operation of the cell by the signal source does not require any consideration since both electrodes are insulated from the liquid crystal to suppress ionic conduction therein at standby conditions or reduced signal levels at operating conditions.

It is to be understood that although a specific 7-segmented numeric display cell has been described, the invention is also applicable to other display assemblies such as those utilizing a crossed grid electrode system. Typically, such systems employ an array of parallel spaced electrode strips on the inner face of one of a pair of spaced substrates, with the inner face of the other coated with an array of parallel spaced electrodes aligned in a direction perpendicular to that of the first array. Under operating conditions, the liquid crystal is activated at desired cross-sections of the spaced electrodes, whose selection can be readily made by suitable addressing circuits well known in the art.

It was found, in D.C. operation, that where the signal is a stepped voltage (as for example as 40 volt 5 millisecond square wave signal pulsed at 30 HZ), most of the pulsed signal will initially appear across the dielectric film. As the field builds up, the voltage level exceeds the breakdown voltage of the dielectric, at which time most of the voltage will appear across the nematic liquid crystal layer. Thus, operation of the cell is characterized with some delay in turn-on time. However, it is to be understood, the time to reach the breakdown voltage of the dielectric is small compared to the time needed to establish scattering regimes in the crystal. Accordingly, the net result is that a thin dielectric film does not significantly affect the turn-on time of the liquid crystal cell. It is to be understood that D.C. operation comprehends pulsed and square wave signals of relatively long signal time as for example 30 Hz indicated above.

Electrically, the dielectric film, sandwiched between a metal electrode and a (conducting) nematic crystal layer, functions in the same manner as the dielectric of a capacitor. In this manner, charge is stored at the interface of the dielectric film and the crystal layer through which the charge must discharge when the signal is turned-off. It was found, that such a stored charge is sufficient to keep the nematic MBBA liquid crystal in the scattering mode for a substantial period of time, as for example, 5 seconds which has been achieved with experimental cells. In contrast, conventional cells, utilizing uninsulated cells, employing MBBA liquid crystal material, the turn-on time is of the order of 20 to 50 milliseconds (depending on the driving field) and the turn-off time is about 300 milliseconds which mitigates against the effectiveness of X-Y addressing of a matrix of dots.

In accordance with this invention, where cells have a turn-off time of 5 seconds or more, one can replenish all dots in one line of an X-Y array before scattering in the cell has diminished to any substantial extent. Accordingly, another feature of this invention is the use of stored charge in the dielectric film to lengthen the apparent turn-off time of a nematic liquid crystal display assembly, with recycle times determined by the charge stored in the dielectric.

In A.C. operation, the capacitance of the dielectric layer 15 is employed in conjunction with the resistance of the liquid crystal layer to establish a threshold frequency of activating the liquid crystal material at signal levels below the breakdown voltage of the dielectric. The desired threshold frequency can be established by controlling, during deposition, the thickness of the dielectric film 15 and the resistance of the liquid crystal layer 3, readily obtained by the addition of suitable dopants to the liquid crystal composition. Illustrative of such modification of the resistance of the liquid crystal, is the addition of choline chloride as a dopant to M.B.B.A.

It is believed that the operation of this A.C. mode of operation will be apparent on consideration of the following observations. At the interface, of dielectric film 15 and the nematic liquid crystal layer 3, an electric double layer forms as dopant ions are absorbed. Thus, there will always be a fixed charge at the interface and a diffused charge distribution in the liquid crystal adjacent to the interface. In this manner the liquid crystal and the electrode with the dielectric, sandwiched therebetween, can be considered as a capacitance. The resultant equivalent circuit of the cell is represented in FIG. 3 where $C_2$ represent the corresponding value of the nematic liquid crystal composition. In this circuit both R and $C_1$ depend on the liquid crystal material and the dopant, and $C_2$ is constant once the dielectric film is deposited. Typically, for nematic liquid crystal cells, the resistance R of the crystal material is of the order of 1 to 10 megaohm/cm2, depending on the doping level and $C_1$, is generally about 150 pF/cm2. Representative values of the capacitance $C_2$, of the dielectric layer 15, are 0.05 microfarads/cm2 for a 2000 Angstrom film of $Al_2O_3$ and about 5000 pF for a 2.5 micron film of $SiO_2$. The effect of frequency variation of the voltage $V_{cell}$ appearing across the liquid crystal layer 15 at a fixed applied voltage $V_A$ across the electrodes of te cell, can be represented by the relationship (for a sinusoidal waveform)

$$\left( \frac{V_{cell}}{V_{applied}} \right)^2 = \frac{(2\pi fRC_2)^2}{1+(2\pi fR(C_2+C_1))^2}$$

where in view of the insignificant value of $C_1$, it may be ignored.

Analysis of the foregoing relationships establishes the following conclusions:

$V_{cell}$ is about equal to the applied voltage as long as $2\pi f$ is larger than $$\frac{1}{RC_2}$$

but $V_{cell}$ is much smaller than the applied voltage if $2\pi f$ is smaller than $$\frac{1}{RC_2}.$$

A graph is shown in FIG. 4 to illustrate the effect of different frequencies on the relationship of the voltage Vcell across the cell. It can be seen from the graph that for a cell fabricated in accordance with this invention (eg. utilizing an insulated electrode) under a fixed applied voltage, the voltage across the liquid crystal layer 3 decreases with decreasing frequencies. For example, assuming a liquid crystal composition whose threshold voltage Vt is 0.5 of the applied voltage, it can be seen that point of Vt on the curve of FIG. 4 establishes a threshold frequency below which the voltage across the liquid crystal layer falls below its threshold voltage. Above the threshold frequency, the cell can be operated to the cut-off frequency of the liquid crystal composition representing a property of the particular liquid crystal composition employed.

Thus, there exists a low frequency cut-off (or threshold) below which the potential across the liquid crystal layer 3 drops below the threshold voltage required for dynamic scattering. This threshold frequency is essentially determined by the resistance R of the liquid crystal layer 3 and the capacitance of the dielectric layer 15, both of which are well within the control of the experimenter. For example, if one uses a nematic liquid crystal such as distilled M.B.B.A. doped with choline chloride to obtain resistivity of $0.4 \times 10^{10}$ ohm-cm in a cell having one electrode insulated with a $SiO_2$ dielectric film of 2.5 micron thickness (eg. an insulated chromium electrode) with an applied voltage of 30 V.A.C., the cell will operate between 2 HZ and the cut-off frequency of the liquid crystal composition which is about 120 Hz. However, if more dopant is added to this liquid crystal composition to modify its resistivity to $0.2 \times 10^3$ ohm-cm, the threshold of frequency at 30 volts, is raised to 40 hz, above which it may be operated to the cut-off frequency of the liquid crystal composition, which is about 1000 hz.

FIGS. 5 and 6 illustrate another embodiment of this invention in which a dielectric film is employed to suppress activation of a nematic liquid crystal between preselected portions of an opposed pair of electrodes. In the description of this embodiment, like or similar elements will be denoted by the same reference numerals.

Basically, the liquid crystal cell of this embodiment is substantially identical to the preceding embodiment with the exception of the configuration of the dielectric layer 15A coated over the electrode pattern on the inner face 16 substrate 4. Such a configured dielectric coating, over an electrode pattern, enables selective activation and/or suppression of activation of the liquid crystal composition when a signal is applied to the electrodes across the liquid crystal layer, e.g. 3.

As in the preceding embodiment, the display cell is illustrated for display of numeric characters via selective activation of a seven-segment electrode pattern comprised in the instant case, of image electrode segments 5 to 11 in conjunctions with their corresponding conductor or lead segments 5A to 11A which extend to an edge of the cell for connection to the signal source 26 under control of addressing circuitry generally represented as control circuit 12.

The distinctions in the dielectric layer comprise relatively thin film portions of the dielectric coated over portions of the electrodes disposed adjacent corresponding portions of the crystal layer in which selected activation is desired, and substantially thicker film portions over the remaining areas of the electrodes. This configuration was incorporated in the illustrated cell by initially R.F. sputtering a relatively thick transparent dielectric $SiO_2$ film eg. of 25.000 angstroms, over the entire inner face 16 of substrate 4 to encapsulate a reflective chromium electrode pattern therebetween inclusive of image segments 5 to 11 and conductor segments 5A to 11A. In the next operation by use of conventional photolithographic techniques, the areas of the dielectric, over the image segments 5 to 11 (of the electrode pattern on substrate 4), were etched, to expose the image segments 5 to 11. This was followed by a second R.F. sputtering of $SiO_2$ to form relatively thin (eg. 1000 angstroms) transparent dielectric segments 5B to 11B over the electrode image segments 5 to 11. Thus, as can be observed, the electrode image segments 5 to 11 are coated with corresponding thin coatings of dielectric film portions 5B to 11B, whereas the conductor segments 5A to 11A are coated with thicker coatings of the dielectric layer 15A which also covers the remaining portions of the inner face 16 of substrate 4.

Also, in this embodiment the electrode on substrate 17 comprised a transparent film of $In_2O_3$.

As will be obvious the breakdown voltage of the thin dielectric segments 5B to 11B will be substantially less than the relatively thick dielectric coating 15A over the remaining portions on the substrate 4 which includes the dielectric over conductor segments 5A to 11A. Thus, by operating at a voltage between the breakdown voltage of the thin and thick dielectric coatings, the liquid crystal layer adjacent the image segments 5 to 11 will be activated into dynamic scattering. Conversely, by further increasing the signal on the cell above the breakdown voltage of the thick dielectric portion 15A, the conductor segments 5A to 11A will also turn on adjacent portions of the liquid crystal layer 18. Accordingly, it will be obvious that various portions of the liquid crystal layer can be sequenced on by virtue of variations of the breakdown voltage obtained by corresponding modification in the thicknesses of a dielectric film coated over an electrode pattern. As will be understood, the breakdown voltages for operation of the cells must be above the threshold voltage of the liquid crystal layer.

Also, such controlled variations in the thicknesses of the dielectric, in conjunction with controlled variations of the liquid crystal resistance, can be employed to establish corresponding threshold frequencies in the same manner discussed above. For example, the thickness of the dielectric image segments 5B to 11B can be controlled in conjunction with the resistance of the liquid crystal, to establish a threshold frequency substantially below the cut-off frequency of the liquid crystal to establish a practical operating range, whereas the thickness of the thick dielectric portion can be designed to establish a second higher threshold frequency for it above the cut-off frequency of the crystal. In this manner, the cell can be operated to turn on only the portions of the liquid crystal adjacent the electrode image segments 5 to 11, eg. only at frequencies above the indicated lower threshold frequency and below the cut-off frequency.

Also, as a corollary variations in the dielectric thicknesses can be employed to establish different threshold frequencies below the cut-off frequency of the liquid crystal for selectively turning different portions of it on. For example, if the dielectric coating 15A (eg. over conductor segments 5A to 11A) is designed (eg. thickness via-a-viz resistance of the crystal material) to have a high threshold frequency below the cut-off frequency of liquid crystal layer, the image segments 5 to 11 can be turned on at frequencies between the lower threshold frequency of liquid crystal layer, the image segments 5 to 11 can be turned on at frequencies between the lower threshold frequency of the thin dielectric film 5B to 11B and the higher threshold frequency of thicker dielectric film 15A. When the frequency is raised above the threshold frequency of thicker dielectric film 15A, the portion of the liquid crystal layer 15A will also be turned on opposite the conductor segments 5A to 11A, up to the cut-off frequency of the liquid crystal. Thus, any desired number of variations in the thicknesses of the dielectric can be employed to sequence on dynamic scattering in any corresponding portions of the liquid crystal layer.

The foregoing can be illustrated in a crystal cell of FIGS. 5 and 6 utilizing a doped chloro-stilbene nematic mixture sandwiched between an $In_2O_3$ electrode and a chromium electrode overcoated with $SiO_2$. The liquid crystal layer had a resistivity of $10^8$ cm-ohm with a frequency cut-off of 1000 HZ. The chromium electrode was configured as a seven-segment numeric display unit in the form shown in FIGS. 5 and 6. The thickness of the dielectric film portions 5B to 11B was 1000 Angstrom over the image segments 5 to 11, while the remaining portions of the dielectric film 15A, inclusive of overcoating of the conductor segments 5A to 11A, was 2.5 microns. At 40 volts (peak-to-peak) and frequencies up to 100hz, dynamic scattering in the liquid crystal was restricted to portions of it adjacent the electrode image segments 5 to 11, with no visible scattering opposite the electrode conductor segments 5A to 11A. When the frequency was raised to 800hz, dynamic scattering was also induced in the portions of the liquid crystal layer 15A opposite the electrode conductor segments 5A to 11A.

While the invention has been particularly shown and described with reference to particular embodiments thereof, it will be understood by those skilled in the art that the frequency and other various changes in form and details may be made therein without departing from the spirit and scope of the invention.

What is claimed is:

1. A liquid crystal cell comprising:
   A. first and second spaced electrodes;
   B. a dielectric coating on the inner face of said first electrode;
   C. a nematic liquid crystal material between said coating and the said second electrode, with said coating separating said liquid crystal material from said first electrode; and
   D. means for applying a voltage of predetermined magnitude and frequency across said first and second electrodes to cause dynamic scattering of said liquid crystal material;

wherein
   E. said dielectric coating is of at least two different thicknesses characterized with a corresponding number of breakdown voltages therefor; and
   F. said voltage applying means controllably supplies a voltage with a frequency of zero and at magnitudes above selected ones of said breakdown voltages.

2. The liquid crystal cell of claim 1 wherein said second electrode is transparent.

3. The liquid crystal cell of claim 2 wherein said first electrode and said coating are transparent.

4. The liquid crystal cell of claim 1 including parallel first and second support plates with the inner face of said first plate having said first electrode coated thereon; and the inner face of said second plate having said second electrode coated thereon.

5. The liquid crystal cell of claim 4 wherein said second electrode comprises a transparent conductive coating on said second plate, and said second plate is transparent.

6. The liquid crystal cell of claim 4 wherein said first electrode comprises a transparent conductive coating on said first plate; and wherein said first plate and said dielectric coating are transparent.

7. The liquid crystal cell of claim 6 wherein said second electrode comprises a transparent conductive coating on said second plate, and said second plate is transparent.

8. A liquid crystal cell comprising:
   A. first and second spaced electrodes;
   B. a dielectric coating on the inner face of said first electrode;
   C. a nematic liquid crystal material between said coating and the said second electrode, with said coating separating said liquid crystal material from said first electrode; and
   D. means for applying a voltage of predetermined magnitude and frequency across said first and second electrodes to cause dynamic scattering of said liquid crystal material;

wherein
   E. said dielectric coating is of at least two different thicknesses, each characterized with a corresponding capacitance forming, in combination with the resistance of said liquid crystal material, a corresponding number of different threshold frequencies for said cell, at least one of which is below the cut-off frequency of said liquid crystal material; and F. said voltage applying means supplies an A.C. voltage operable at frequencies between the lowest of said threshold frequencies and said cutoff frequency.

9. The liquid crystal cell of claim 8 wherein said second electrode is transparent.

10. The liquid crystal cell of claim 9 wherein said first electrode and said coating are transparent.

11. The liquid crystal cell of claim 8 including a pair of parallel first and second support plates with the inner face of said first plate having said first electrode coated thereon; and the inner face of said second plate having said second electrode coated thereon.

12. The liquid crystal cell of claim 11 wherein said second electrode comprises a transparent conductive coating of said second plate, and said second plate is transparent.

13. The liquid crystal cell of claim 11 wherein said second electrode comprises a transparent conductive coating on said first plate; and wherein said first plate and said dielectric coating are transparent.

14. The liquid crystal cell of claim 13 wherein said second electrode comprises a transparent conductive coating on said second plate, and said second plate is transparent.

15. A liquid crystal cell comprising:
A. first and second spaced electrodes;
B. a dielectric coating on the inner face of said first electrode;
C. a nematic liquid crystal material between said coating and said second electrode, with said coating separating said material from said first electrode;
D. with said first electrode comprising an image portion connected to a lead portion,
E. said dielectric coating comprising
 a. a thin first coating portion over said image portion and having a thickness characterized by a capacitance forming in conjunction with the resistance of said liquid crystal material, a first threshold frequency below the imaging frequency cut-off of said liquid crystal material, and
 b. a relatively thicker second portion over said lead portion having a thickness characterized by a capacitance forming in conjunction with said resistance of said liquid crystal material, a second threshold frequency above said first threshold frequency, and
F. means for applying an alternating voltage
 a. below the breakdown voltage of said coating,
 b. across said first and second electrodes, operable at
 c. frequencies between said first threshold frequency and the cut-off frequency of said liquid crystal material.

16. A liquid crystal display assembly comprising a layer of nematic liquid crystal material having one face disposed in contacting relationship adjacent a dielectric layer, and voltage means for applying a voltage of predetermined magnitude and frequency to cause dynamic scattering of said liquid crystal material, and including:
A. a first electrode having said dielectric layer coated thereon and comprising an image electrode portion and a lead electrode portion with said dielectric layer comprising
 a. a first coating portion over said image portion and having a thickness characterized by a capacitance forming, in conjunction with the resistance of said liquid crystal material, a first threshold frequency below the imaging frequency cut-off of said liquid crystal material, and
 b. a relatively thicker second coating portion over said lead portion and having a thickness characterized by a capacitance forming, in conjunction with said resistance of said liquid crystal material, a second threshold frequency above said first threshold frequency,
B. a second electrode disposed adjacent the opposite face of the said liquid crystal layer, with said voltage means applied across said first and second electrodes below the breakdown voltage of said first dielectric portion and at a frequency
C. between said first threshold frequency and the said cut-off frequency of said liquid crystal material.

17. A liquid crystal display assembly comprising:
A. first and second spaced electrodes with at least one of said electrodes comprising an image portion and a connected lead portion;
B. first and second dielectric coatings on the inner-faces of respective ones of said first and second electrodes with at least one of said dielectric coatings comprising
 a. a thin first coating portion in register and coextension with said image portion and having a thickness characterized by a capacitance forming, in combination with the resistance of said liquid crystal material, a first threshold frequency below the imaging frequency cut-off of said liquid crystal material,
 b. and a relatively thicker second coating portion in register and coextension with said lead portion, and having a thickness characterized by a capacitance forming, in conjunction with said resistance of said liquid crystal material, a second threshold frequency above said first threshold frequency;
C. a nematic liquid crystal material between said coatings with said coatings separating said liquid crystal material from their respective electrodes; and
D. means for applying an alternating voltage of predetermined amplitude and frequency
 a. below the breakdown voltage of said coatings,
 b. across said first and second electrodes
 c. and with said frequency being in a range between said first threshold frequency and said cutoff frequency of said liquid crystal.

18. A device comprising:
A. spaced dielectric substrates at least one of which is transparent;
B. spaced electrodes between adjacent surfaces of said substrates for generating an electric potential therebetween;
C. a dielectric film overcoated on at least one of said electrodes;
D. a nematic liquid crystal material disposed between said electrodes;
E. means for applying an electric signal of predetermined magnitude and frequency to said electrode means to cause dynamic scattering in said liquid crystal material;
wherein
F. one of said electrodes comprises an image portion and a lead portion; with
G. said dielectric film including at least a. one film portion in register with said image portion and having a thickenss characterized by a capacitance forming, in conjunction with the resistance of said liquid crystal material, a first threshold frequency below the imaging frequency cut-off of said liquid crystal material, and
b. A second film portion in register with said lead means and having a thickness characterized by a capacitance forming, in conjunction with said resistance of said liquid crystal material, a second threshold frequency above said first threshold frequency and below said imaging frequency cut-off of said liquid crystal material; and H. said signal is AC below the breakdown voltage of said thin dielectric film portion and operable at frequencies between said first threshold frequency and said cut-off frequency of said liquid crystal material.

* * * * *